J. M. OKNIANSKI.
HINGE.
APPLICATION FILED MAY 11, 1921.
1,395,593.
Patented Nov. 1, 1921.
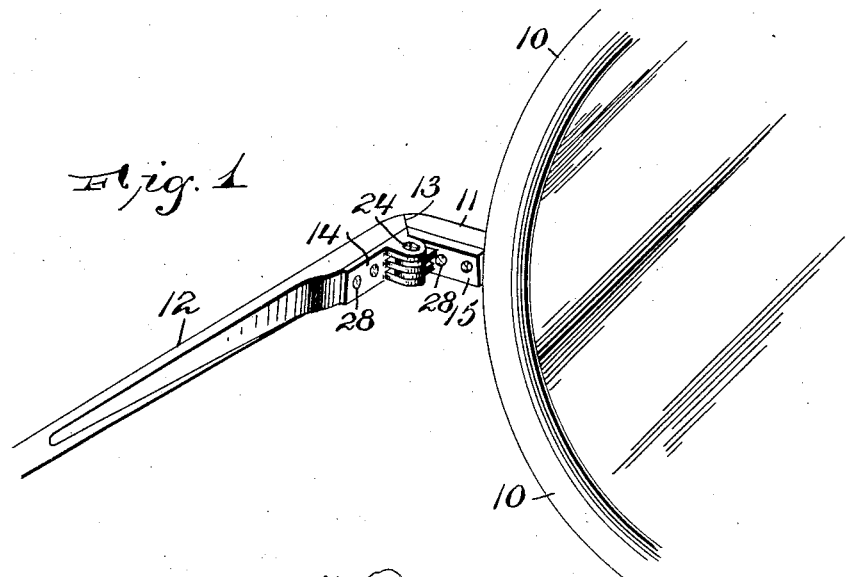
Fig. 1
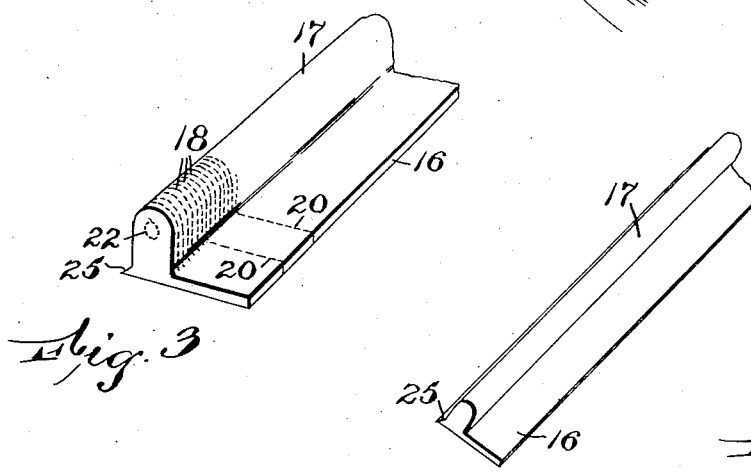
Fig. 3
Fig. 2
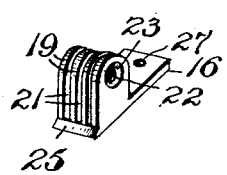
Fig. 4
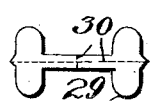
Fig. 6
Fig. 5
INVENTOR
John M. Oknianski;
BY
Wm H Canfield
ATTORNEY

UNITED STATES PATENT OFFICE.

JOHN M. OKNIANSKI, OF NEWARK, NEW JERSEY.

HINGE.

1,395,593.  Specification of Letters Patent.  Patented Nov. 1, 1921.

Application filed May 11, 1921. Serial No. 468,620.

*To all whom it may concern:*

Be it known that I, JOHN M. OKNIANSKI, a citizen of Poland, and a resident of Newark, county of Essex and State of New Jersey, have invented certain new and useful Improvements in Hinges, of which the following is a specification.

This invention relates to an improved hinge, and particularly the kind used to secure temples to the rims or lenses of spectacles.

The invention is designed to provide a hinge that opens to a point where the hinge members abut with precision and thus take all strain from the rims and temples, and in constructions where the rim and the temple are joined by a miter joint there is a perfect miter as between the temple joint and the hinge abutment.

The invention also relates to a method of making the hinge, the two members of which are made from a strip, the strip being the same for both members, this method making a construction possible, which construction is precise and is also economical to make.

The invention is illustrated in the accompanying drawing, in which Figure 1 is a perspective view showing a hinge applied to the joint of an eyeglass rim and at the temple thereof. Fig. 2 is a perspective view of a strip from which the hinge members are made. Fig. 3 is a similar view, slightly enlarged, showing in dotted outline the manner of milling the strip to form the knuckles. Fig. 4 is a perspective view of a hinge member made from the strip shown in Fig. 3, and Fig. 5 is an edge view of a strip of modified form. Fig. 6 shows a modified form of strip.

The hinge is used where the temples of spectacles are fastened to the rims of the spectacles, in the form shown 10 representing the rim, the abutment or projecting part 11 of which is pivotally connected to the end of the temple 12. When the temple is swung to its open position, which is the position it is in when the temple is extended to be hooked over the ear, the two opposed faces abut, as at 13.

The hinge is fastened at the inner faces of the adjacent parts of the temple 12 and the part 11 of the rim, the hinge comprising two members 14 and 15. These are made from a strip shown in Fig. 2, which strip is usually drawn as is wire, and since these hinges are very small such manufacture is possible, although other means of making the strip can be employed.

The strip is shown in Fig. 2 and comprises a base portion 16 and a rib 17 which extends transversely from the base portion and is milled transversely along the line shown at 18 in Fig. 3 so as to provide a row of knuckles 19 shown in Fig. 4. The milled strip is then cut as shown by the dotted lines 20 in Fig. 3, these cuts being usually so disposed as to make the outside of the knuckles on one member define the width of the hinge, and the spaces between the knuckles being the outside elements on the next member, so that when one is reversed and turned over on the other they will interlock, as shown in Fig. 1, since the spaces 21 between the knuckles are as wide as the knuckles themselves.

Perforations 22 are drilled through the knuckles, being counter-sunk on one member, as at 23 in Fig. 4, so as to permit the head of the screw 24 to be inserted as a pintle to hold the members of the hinge in swinging relation.

The rib 17 is placed closely adjacent to one edge of the base part 16, and the base beyond the edge of the rib 17 is beveled or mitered, as at 25, this being at an angle of forty-five degrees with the base, so that when the members of the hinge are swung to a position at right angles to each other these beveled faces 25 abut, as shown in Fig. 1, thus taking the strain from the abutting faces of the hinged elements, as at 13, and there is no strain put on the hinge tending to injure the parts 11 and 12, since the whole strain of limiting the movement is localized within the metal members of the hinge and not on any brittle or similar material such as the temples and rims are made of, such as tortoise shell or celluloid.

In Fig. 5 I show a modified form of strip in which the strip is made double, the base plate 16 having two ribs 17, and in such case a cutter can be run in between the two ribs 17, and if this cutter is made beveled it can perform the double function of cutting the bevel 26 and also separating the two strips, each then adapted to be individually manipulated as heretofore described. The parts are identical when made in this way and the two hinge members fit closely together at all parts, and particularly along the whole surface of the beveled edge 25 when the hinge members are swung apart.

The hinge members are fastened by suitable means, the form shown comprising holes 27 that are placed in the base plate of each hinge member, through which suitable rivets 28 are passed to secure the hinge members to their respective elements.

In Fig. 6 I show the strip 29 which can be split or cut, as at 30, to form strips similar to that shown in Fig. 2.

I claim:

1. A hinge formed of two members, each member comprising a base plate and transversely projecting knuckles, the base plates beyond the knuckles being beveled to form a miter abutment for the entire width of each plate to limit the swinging of the hinge.

2. A temple hinge formed of two members, each member comprising a base plate and transversely projecting knuckles, said knuckles being closely adjacent one end of the base plate, the knuckles being separated by a space equal to the width of a knuckle, each base plate at the outer edge of the knuckle being beveled to form a miter abutment for the swinging members, said abutment extending the entire width of each member, the members being identical in outline in cross-section.

3. A method of making hinges comprising the provision of a strip of metal with a base plate and a projecting rib, slitting the rib transversely to form knuckles, cutting the strip into lengths, perforating the knuckles, and then securing two of said lengths together through the perforations to form a hinge.

4. A method of making hinges comprising the provision of a strip of metal with a base plate and a projecting rib and having the edge adjacent the rib beveled, slitting the rib transversely to form knuckles, cutting the strip into lengths, perforating the knuckles, and then securing two of said lengths together through the perforations to form a hinge.

In testimony that I claim the foregoing, I have hereto set my hand, this 2nd day of May, 1921.

JOHN M. OKNIANSKI.